United States Patent
Tenno et al.

(10) Patent No.: US 10,511,350 B2
(45) Date of Patent: Dec. 17, 2019

(54) ANTENNA DEVICE AND ELECTRONIC DEVICE

(71) Applicant: Murata Manufacturing Co., Ltd., Nagaokakyo-shi, Kyoto-fu (JP)

(72) Inventors: Nobuyuki Tenno, Nagaokakyo (JP); Hiromitsu Ito, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 9 days.

(21) Appl. No.: 16/010,529

(22) Filed: Jun. 18, 2018

(65) Prior Publication Data
US 2018/0302125 A1  Oct. 18, 2018

Related U.S. Application Data

(63) Continuation of application No. PCT/JP2017/012282, filed on Mar. 27, 2017.

(30) Foreign Application Priority Data

Apr. 28, 2016  (JP) .................................. 2016-091848

(51) Int. Cl.
| | |
|---|---|
| *H01Q 1/22* | (2006.01) |
| *H04B 5/00* | (2006.01) |
| *H01Q 7/00* | (2006.01) |
| *H01Q 1/24* | (2006.01) |
| *H01Q 7/06* | (2006.01) |

(52) U.S. Cl.
CPC ............ *H04B 5/0081* (2013.01); *H01Q 1/22* (2013.01); *H01Q 1/243* (2013.01); *H01Q 7/00* (2013.01); *H01Q 7/06* (2013.01)

(58) Field of Classification Search
CPC ............ H01Q 1/22; H01Q 1/243; H01Q 7/00; H01Q 7/06
See application file for complete search history.

(56) References Cited

U.S. PATENT DOCUMENTS

| | | |
|---|---|---|
| 9,106,313 B2 | 8/2015 | Ueki et al. |
| 2007/0252703 A1 | 11/2007 | Kato et al. |
| 2008/0122724 A1 | 5/2008 | Kato |
| 2013/0229319 A1 | 9/2013 | Miura et al. |

(Continued)

FOREIGN PATENT DOCUMENTS

| | | |
|---|---|---|
| EP | 2 012 258 A1 | 1/2009 |
| JP | 2013-168756 A | 8/2013 |

(Continued)

OTHER PUBLICATIONS

Official Communication issued in International Patent Application No. PCT/JP2017/012282, dated May 16, 2017.

*Primary Examiner* — Graham P Smith
(74) *Attorney, Agent, or Firm* — Keating & Bennett, LLP

(57) ABSTRACT

An antenna device includes a first coupling conductor connected to a power supply circuit, a second coupling conductor at least magnetically coupled to the first coupling conductor, a first capacitor connected in series to the second coupling conductor, a second capacitor connected in parallel to a series circuit including the second coupling conductor and the first capacitor, and an electrically conductive member connected to the second capacitor and defining a portion of or the entire closed loop together with the second capacitor. The capacitance of the first capacitor is smaller than the capacitance of the second capacitor.

18 Claims, 14 Drawing Sheets

(56) References Cited

U.S. PATENT DOCUMENTS

2014/0203981 A1 7/2014 Nakano et al.
2015/0116168 A1 4/2015 Yosui

FOREIGN PATENT DOCUMENTS

| WO | 2007/119310 A1 | 10/2007 |
| WO | 2007/125683 A1 | 11/2007 |
| WO | 2012/111430 A1 | 8/2012 |
| WO | 2012/153691 A1 | 11/2012 |
| WO | 2014/003163 A1 | 1/2014 |
| WO | 2014/098024 A1 | 6/2014 |

307A

ANTENNA DEVICE AND ELECTRONIC DEVICE

CROSS REFERENCE TO RELATED APPLICATIONS

This application claims the benefit of priority to Japanese Patent Application No. 2016-091848 filed on Apr. 28, 2016 and is a Continuation Application of PCT Application No. PCT/JP2017/012282 filed on Mar. 27, 2017. The entire contents of each application are hereby incorporated herein by reference.

BACKGROUND OF THE INVENTION

1. Field of the Invention

The present invention relates to an antenna device that includes a coupling conductor connected to a power supply circuit and an electrically conductive member, and to an electronic device that includes the antenna device.

2. Description of the Related Art

An antenna device that uses a metal member, such as a metal housing of an electronic device, as a radiating element is disclosed in, for example, International Publication No. 2014/003163. In the antenna device, as a result of a first coil connected to a power supply circuit and a second coil connected to a conductive member formed of, for example, a metal member of the electronic device being magnetically coupled to each other, a loop including the conductive member defines and functions as a magnetic-field radiating element.

FIG. 23 illustrates an example of an equivalent circuit of an antenna device described in International Publication No. 2014/003163. In FIG. 23, a power supply circuit is connected to a first coil L21. A second coil L22 is magnetically coupled to the first coil L21. An inductor L0 corresponds to a loop including the conductive member. The inductor L0 and the second coil L22 form a closed loop.

In the antenna device described in International Publication No. 2014/003163, the second coil L22 does not directly contribute to coupling between the antenna device and a coil antenna of a communication target. Thus, the larger the inductance of the second coil L22, the smaller the coupling coefficient between the antenna device and the coil antenna of the communication target. In other words, the inductance of the second coil L22 connected to the loop including the conductive member equivalently becomes notable. As a result, favorable communication characteristics cannot be obtained.

In order to increase the coupling coefficient between the antenna device and the coil antenna of the communication target, it is important to further reduce the inductance of the second coil L22. However, in order to ensure a reasonable coupling coefficient with respect to the first coil L21, the inductance of the second coil L22 cannot be greatly reduced as a result.

SUMMARY OF THE INVENTION

Preferred embodiments of the present invention provide antenna devices that are each capable of increasing the coupling coefficient between the antenna device and a coil antenna of a communication target and obtaining favorable communication characteristics, and electronic devices that include the antenna devices.

An antenna device according to a preferred embodiment of the present invention includes a first coupling conductor that is connected to a power supply circuit, a second coupling conductor that is at least magnetically coupled to the first coupling conductor, a first capacitor that is connected in series to the second coupling conductor, a second capacitor, and an electrically conductive member that includes an inductance component and that is connected in parallel to the second capacitor when viewed from a series circuit including the second coupling conductor and the first capacitor. A portion of or an entire closed loop including the second capacitor and the electrically conductive member defines a magnetic-field radiating element, and a capacitance of the first capacitor is smaller than a capacitance of the second capacitor.

With the above-described configuration, the amount of current that flows through the closed loop including the second capacitor and the electrically conductive member is increased, and as a result, the coupling coefficient between the antenna device and a coil antenna of a communication target is increased.

The first coupling conductor has, for example, a coil shape. As a result, the magnetic coupling between the first coupling conductor and the second coupling conductor is improved.

The second coupling conductor has, for example, a coil shape. As a result, the magnetic coupling between the first coupling conductor and the second coupling conductor is improved.

For example, the first coupling conductor and the second coupling conductor are integrated with an insulating base, and the insulating base, the first coupling conductor, and the second coupling conductor define a single mounting component. With this structure, a coupled circuit including the first coupling conductor and the second coupling conductor is easily fabricated by mounting the mounting component on a circuit board. In addition, variations in the coupling coefficient of the first coupling conductor and the second coupling conductor due to variations in a mounting position of the mounting component are reduced.

In an antenna device according to a preferred embodiment of the present invention, for example, the first coupling conductor is integrated with an insulating base, and the insulating base and the first coupling conductor define a single mounting component. The second coupling conductor is defined by a conductor pattern provided on a circuit board, and the mounting component is mounted close to the conductor pattern. With this structure, a coupled circuit including the first coupling conductor and the second coupling conductor is easily fabricated by mounting the mounting component on a circuit board.

It is preferable that an inductance of the first coupling conductor is larger than an inductance of the second coupling conductor. As a result, when a resonance circuit is defined by the first coupling conductor and a circuit such as a power supply circuit that is connected to the first coupling conductor, the accuracy of a resonant frequency with respect to the accuracy of the inductance of the first coupling conductor is improved.

At least a portion of the electrically conductive member is, for example, a conductive portion of a housing in which the first coupling conductor and the second coupling conductor are disposed. With this structure, a portion of a housing of an electronic device also defines and functions as an antenna device, and thus, the number of elements and members required to define the antenna device is reduced. In addition, a reduction in the size of the electronic device or an increase in the gain of the antenna device are achieved.

At least a portion of the electrically conductive member is, for example, a ground conductor pattern provided on a circuit board. As a result, the electric potential of the electrically conductive member and the electric potential of the second capacitor are stabilized. In addition, as a result, each of the electrically conductive member and the second capacitor is prevented from becoming a noise emitter.

The electrically conductive member also defines and functions as, for example, a radiator in a frequency band higher than a frequency band of a signal fed by the power supply circuit. As a result, the electrically conductive member defines and functions as both radiating elements of at least two frequency bands, and thus, a reduction in the sizes of the antenna device and the electronic device is achieved.

An electronic device according to a preferred embodiment of the present invention includes an antenna device. The antenna device includes a first coupling conductor that is connected to a power supply circuit, a second coupling conductor that is at least magnetically coupled to the first coupling conductor, a first capacitor that is connected in series to the second coupling conductor, a second capacitor, and an electrically conductive member that includes an inductance component and that is connected in parallel to the second capacitor when viewed from a series circuit including the second coupling conductor and the first capacitor. A portion of or an entire closed loop including the second capacitor and the electrically conductive member defines a magnetic-field radiating element, and a capacitance of the first capacitor is smaller than a capacitance of the second capacitor.

With the above-described configuration, an electronic device including an antenna device that is coupled to an antenna of a communication target with a high coupling degree is obtained.

According to preferred embodiments of the present invention, antenna devices each having a high coupling coefficient with a coil antenna of a communication target and electronic devices that include the antenna devices are obtained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
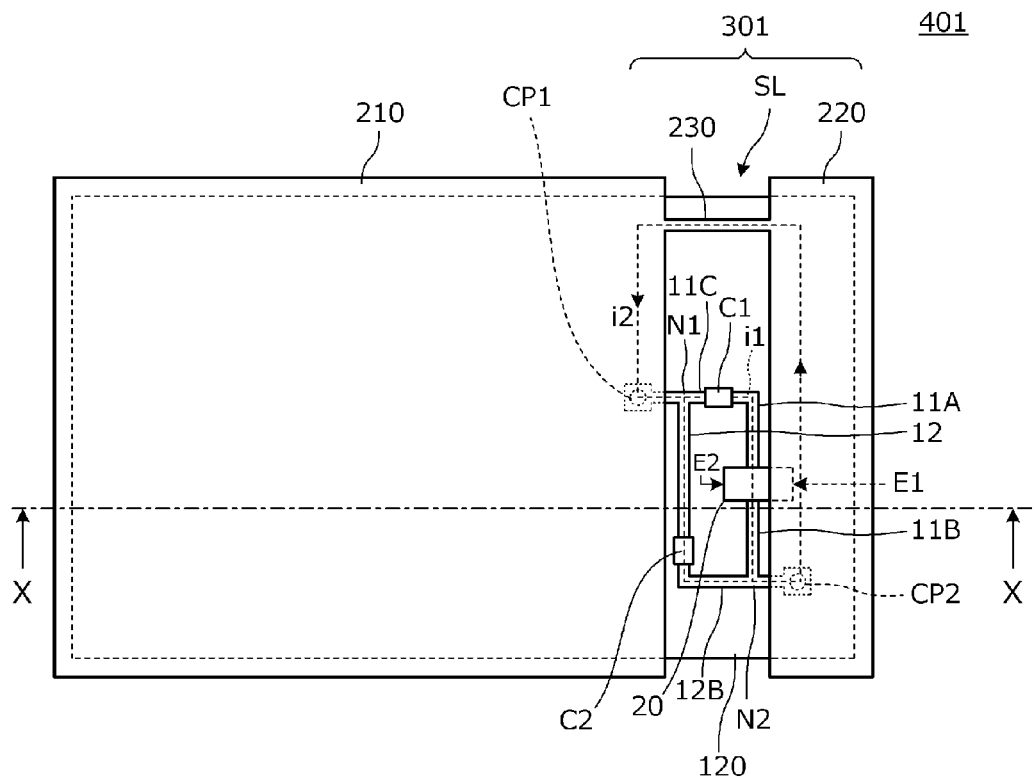
FIG. 1A is a plan view illustrating a principal portion of an electronic device 401 according to a first preferred embodiment of the present invention.

A plurality of preferred embodiments of the present invention will be described below referring to specific examples with reference to the drawings. The same members in the drawings are denoted by the same reference signs. To facilitate the description of the main points and understanding thereof, the preferred embodiments will be described separately. However, the configurations according to the different preferred embodiments may be partially replaced with one another or may be combined with one another. In a second preferred embodiment and the subsequent preferred embodiments, description of matters that are common to a first preferred embodiment will be omitted, and only differences from the first preferred embodiment will be described. In particular, similar advantageous effects obtained in similar configurations will not be described in every preferred embodiment.

In each of the preferred embodiments, an "antenna device" may be applied to both a transmission side and a reception side of a signal (or electrical power). Even when the antenna device is described as an antenna that radiates a magnetic flux, the antenna device is not limited to being a source of the magnetic flux. Even when the antenna device receives a magnetic flux generated by an antenna device of a transmission target (even when magnetic flux linkage occurs), that is, even if the transmission/reception relationship between the antenna device and the antenna device of the transmission target is reversed, similar advantageous effects may be obtained.

In each of the preferred embodiments, the "antenna device" is an antenna device used to perform near field communication using magnetic coupling with an antenna device of a communication target or an antenna device used to perform power transmission in a near field using magnetic coupling with an antenna device of a power transmission target. In the case of communication, the antenna device is preferably used in, for example, a communication system, such as near field communication (NFC). In the case of power transmission, the antenna device may be used in, for example, a power transmission system using magnetic coupling, such as electromagnetic induction coupling or magnetic field resonance coupling. In other words, in each of the preferred embodiments, the "antenna device" may be used in a wireless transmission system, such as communication or power transmission that uses at least magnetic coupling. Note that, in each of the preferred embodiments, the "antenna device" also includes an antenna device that substantially performs wireless transmission by electromagnetic field coupling (magnetic field coupling and electric field coupling) with an antenna device of a transmission target.

In each of the preferred embodiments, the "antenna device" preferably uses, for example, the HF band, particularly about 13.56 MHz, about 6.78 MHz or a frequency band in the vicinity of these frequencies. The size of the antenna device is sufficiently small compared to the wavelength $\lambda$ at a frequency to be used, and in an operating frequency band, the antenna device has low electromagnetic-wave radiation efficiency. The size of the antenna device is preferably equal to or smaller than about $\lambda/10$, for example. More specifically, the length of a current path of the antenna device is preferably equal to or smaller than about $\lambda/10$, for example. Note that the term "wavelength" refers to an effective wavelength in consideration of a wavelength shortening effect obtained by the dielectric property and the magnetic permeability of a base member on which a conductor is provided.

In each of the preferred embodiments, an "electronic device" is preferably, for example, one of various electronic devices including cellular phone terminals, such as a smartphone and a feature phone, wearable terminals, such as a smartwatch and smartglasses, portable PCs, such as a notebook PC and a tablet PC, information devices, such as a camera, a game device, and a toy, and information media, such as an IC tag, an SD card, a SIM card, and an IC card.

First Preferred Embodiment

In a first preferred embodiment of the present invention, an example of an antenna device that uses a conductive portion of a housing of an electronic device as a planar conductor and an example of the electronic device that includes the antenna device are described.

Figure 1B:
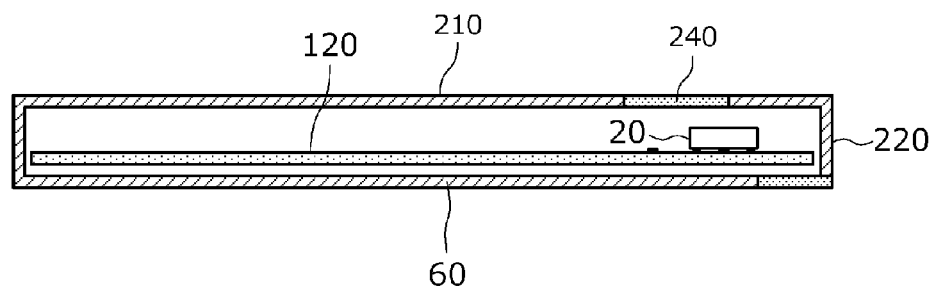
FIG. 1B is a sectional view taken along line X-X of FIG. 1A.

FIG. 1A is a plan view illustrating a principal portion of an electronic device 401 according to the first preferred embodiment, and FIG. 1B is a sectional view taken along line X-X of FIG. 1A. Note that FIG. 1A illustrates a state in which a housing resin portion 240, which will be described below, has been removed from the electronic device 401.

The electronic device 401 is preferably, for example, a portable electronic device, such as a smartphone, and includes an antenna device 301. The electronic device 401 includes a first conductive portion 210 and a second conductive portion 220 of a housing that are located on the side opposite to the side on which a surface of the electronic device 401 in which a display and operation panel 60 is provided. The first conductive portion 210 and the second conductive portion 220 are connected to each other by a conductive portion 230. The housing resin portion 240 is disposed in a gap SL between the first conductive portion 210 and the second conductive portion 220 (the gap SL is closed by the housing resin portion 240).

A circuit board 120 is disposed in a space surrounded by the first conductive portion 210 and the second conductive portion 220. First conductor patterns 11A, 11B, and 11C and second conductor patterns 12A and 12B are provided on the circuit board 120. The second conductor patterns 12A and 12B are connected in parallel to the first conductor patterns 11A, 11B, and 11C at a first node N1 and a second node N2. In addition, a coupling device 20, which is a chip mounting component, a first capacitor C1, which is a chip capacitor, and a second capacitor C2, which is a chip capacitor, are mounted on the circuit board 120. Furthermore, a power supply circuit including a matching circuit, an RFIC, and other components, which will be described later, is provided on the circuit board 120.

As will be described later, the coupling device 20 includes a coil conductor defining a coupling coil that is wound around a winding axis thereof in a helical manner and includes a first coil-opening end E1 and a second coil-opening end E2 facing each other with the coil conductor interposed therebetween. The coupling device 20 includes a first coupling conductor and a second coupling conductor that are integrated with an insulating base. The power supply circuit is connected to the first coupling conductor. The second coupling conductor is at least magnetically coupled to the first coupling conductor.

The second coupling conductor of the coupling device 20 is connected in series to the first conductor patterns 11A, 11B, and 11C. The first capacitor C1 is also connected in series to the first conductor patterns 11A, 11B, and 11C. Accordingly, the first capacitor C1 is connected in series to the second coupling conductor.

The second capacitor C2 is connected in series to the second conductor patterns 12A and 12B. Accordingly, the second capacitor C2 is connected in parallel to a series circuit including the second coupling conductor and the first capacitor C1.

A connecting portion CP1 is extended from the first node N1, and a connecting portion CP2 is extended from the second node N2. Each of the connecting portions CP1 and CP2 is provided with a movable probe pin. These movable probe pins are respectively in contact with and electrically connected to the first conductive portion 210 and the second conductive portion 220 of the housing. Thus, a first current path including the first conductor patterns 11A, 11B, and 11C is provided, and a second current path defining a closed loop includes the first conductive portion 210, the second conductive portion 220, the conductive portion 230, and the second conductor patterns 12A and 12B. In FIG. 1A, a current i1 and a current i2 conceptually denote a current that flows through the first current path and a current that flows through the second current path, respectively.

The first conductive portion 210 and the second conductive portion 220 of the housing are electrically conductive members that define a closed loop together with the second capacitor, and each of these electrically conductive members defines and functions as one of a plurality of radiating elements.

Figure 2:
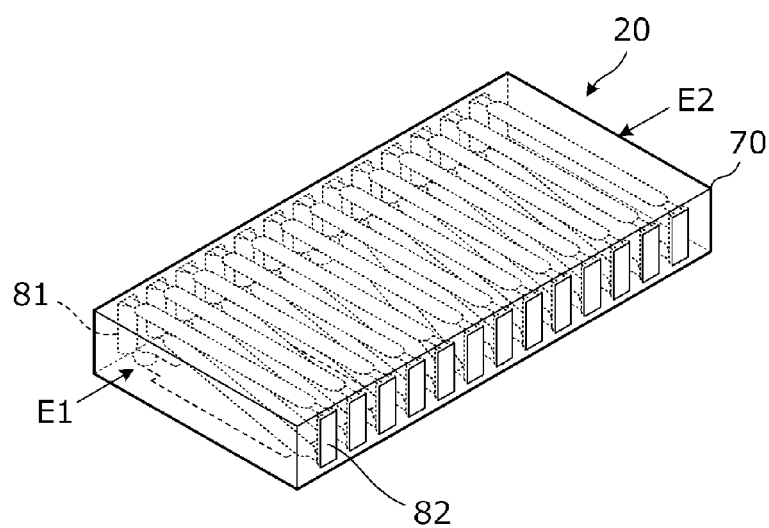
FIG. 2 is a perspective view of a coupling device 20.
Figure 3:
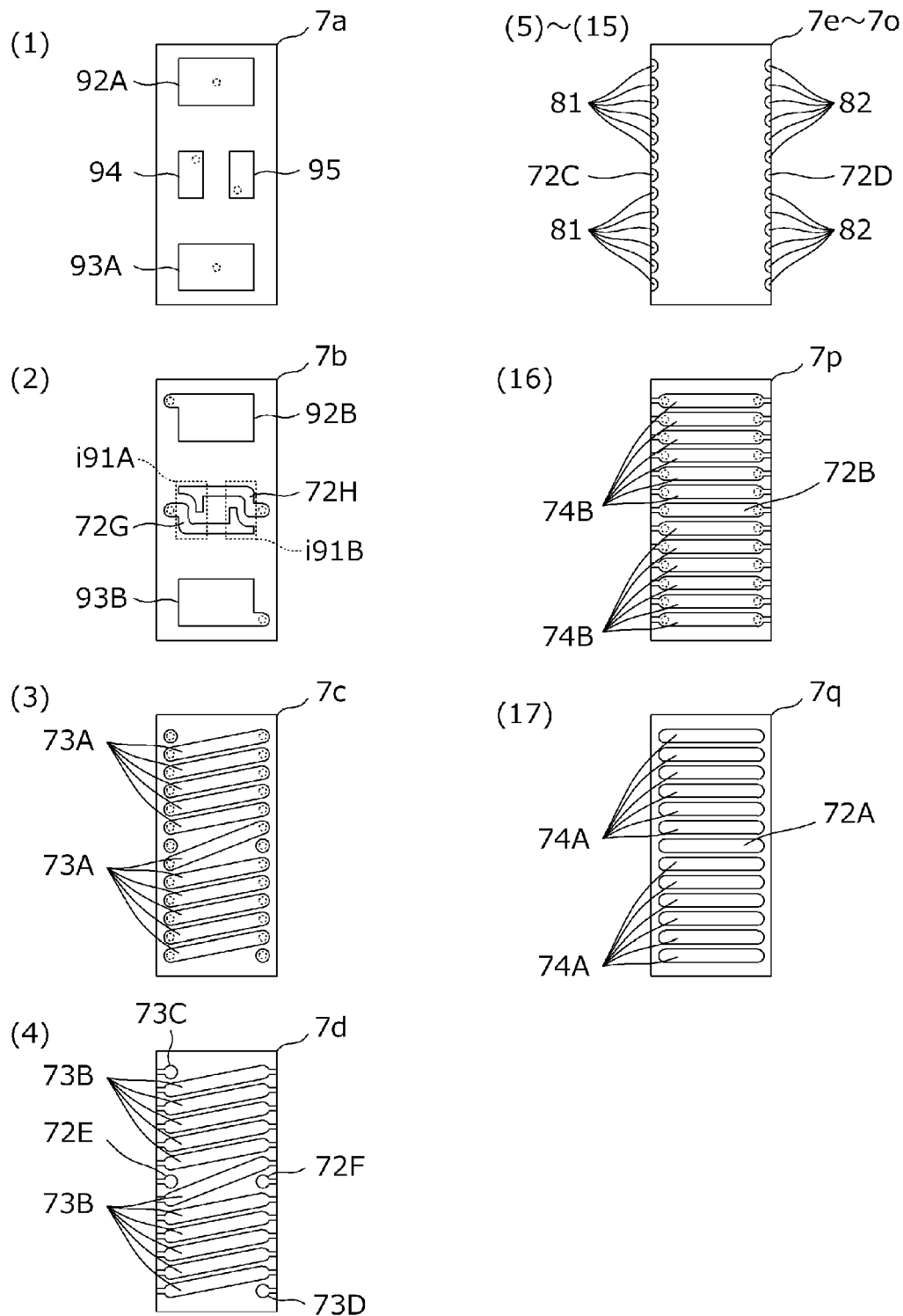
FIG. 3 is an exploded plan view illustrating electrode patterns and other structure of base-material layers of a multilayer substrate 70 in the coupling device 20.
Figure 4:
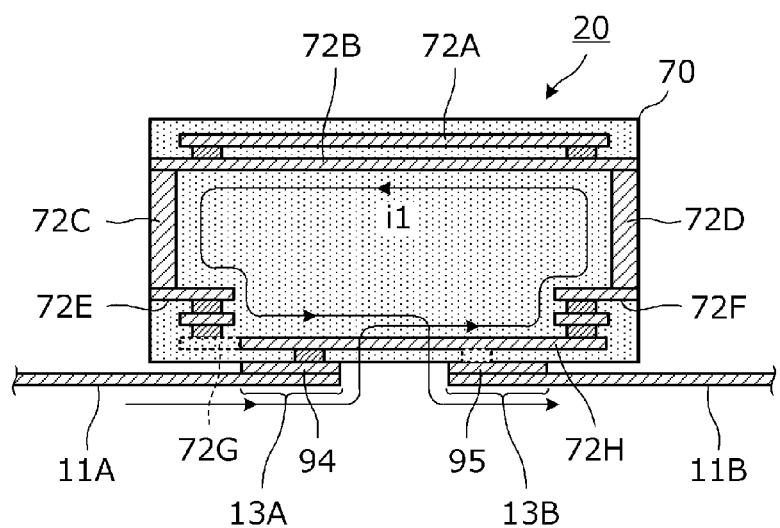
FIG. 4 is a cross-sectional view illustrating a path of a current that flows through a second coupling conductor, the path being located within the coupling device 20.

A detailed structure of the coupling device will now be described. FIG. 2 is a perspective view of the coupling device 20. FIG. 3 is an exploded plan view illustrating electrode patterns and other elements of base-material layers of a multilayer substrate 70 in the coupling device 20. FIG. 4 is a cross-sectional view illustrating a path of a current that flows through the second coupling conductor, the path being provided within the coupling device 20.

Two terminals 92A and 93A connecting the coupling device 20 to the power supply circuit, which is preferably defined by the RFIC, for example, and two terminals 94 and 95 connecting the coupling device 20 to connection pads 13A and 13B, which are respectively a portion of the first conductor pattern 11A and a portion of the first conductor pattern 11B, are provided on a bottom surface (mounting surface) of the coupling device 20.

In the multilayer substrate 70, a plurality of base-material layers 7a to 7q are stacked on top of one another in the order indicated by (1) to (17) in FIG. 3. In FIG. 3, (1) illustrates the lowermost layer, and (17) illustrates the uppermost layer. In FIG. 3, (1) to (17) illustrate bottom surfaces of the base-material layers 7a to 7q, and the bottom surface of the base-material layer 7a is a mounting surface of the multilayer substrate 70.

The base-material layers 7a, 7b, 7c, 7p, and 7q are non-magnetic layers each preferably having a rectangular or substantially rectangular parallelepiped shape and are made of, for example, a non-magnetic ferrite. The base-material layers 7d to 7o are magnetic layers each preferably having a rectangular or substantially rectangular parallelepiped shape and are made of, for example, a magnetic ferrite. In other words, the multilayer substrate 70 has a configuration in which the base-material layers 7d to 7o, which are magnetic layers, are sandwiched between the base-material layers 7a, 7b, 7c, 7p, and 7q, which are non-magnetic layers. Note that each of the base-material layers 7a to 7q does not need to be a magnetic layer or a non-magnetic layer as long as the base-material layer is an insulator. The term "non-magnetic layer" refers to a layer having a permeability lower than that of each of the magnetic layers, and each of the non-magnetic layers does not need to be a non-magnetic member and may be a magnetic member whose relative permeability is about 1 or more and is lower than the relative permeability of each of the magnetic layers.

The terminals 92A and 93A and the terminals 94 and 95 are provided on the bottom surface of the base-material layers 7a illustrated in (1) of FIG. 3.

Outer connection conductors 92B and 93B and linear conductors 72G and 72H are provided on the bottom surface of the base-material layer 7b illustrated in (2) of FIG. 3. The outer connection conductors 92B and 93B are respectively connected to the terminals 92A and 93A via an interlayer connection conductor. The linear conductors 72G and 72H are respectively connected to the terminals 94 and 95 via an interlayer connection conductor.

A plurality of linear conductors 73A are provided on the bottom surface of the base-material layer 7c illustrated in (3) of FIG. 3. A plurality of linear conductors 73B and linear conductors 72E and 72F are provided on the bottom surface of the base-material layer 7d illustrated in (4) of FIG. 3. The plurality of linear conductors 73A and the linear conductors 73B are connected in parallel to each other via an interlayer connection conductor.

End surface conductors 81, 82, 72C, and 72D are provided on the base-material layers 7e to 7o illustrated in (5) to (15) of FIG. 3.

A plurality of linear conductors 74B and one linear conductor 72B are provided on the bottom surface of the base-material layer 7p illustrated in (16) of FIG. 3. A plurality of linear conductors 74A and one linear conductor 72A are provided on the bottom surface of the base-material layer 7q illustrated in (17) of FIG. 3. The plurality of linear conductors 74A and the linear conductors 74B are connected in parallel to each other via an interlayer connection conductor. The linear conductor 72A and the linear conductor 72B are connected in parallel to each other via an interlayer connection conductor.

The plurality of linear conductors 73B are sequentially connected in series to the plurality of linear conductors 74B via the end surface conductors 81 and 82. The linear conductors 72E and 72F are connected to the linear conductor 72B via the end surface conductors 72C and 72D.

The linear conductors 74A, 74B, 73A, and 73B and the end surface conductors 81 and 82 define the first coupling conductor that is preferably wound in about twelve turns and has a rectangular or substantially rectangular helical shape, for example.

The linear conductors 72A, 72B, 72E, 72F, 72G, and 72H, the end surface conductors 72C and 72D, and other elements define the second coupling conductor that is preferably wound in about one turn and has a rectangular or substantially loop shape, for example.

In FIG. 4, the current i1 denotes a path of the current that flows through the second coupling conductor. As described above, the coupling device 20 includes the coupling coil and the second coupling conductor that is positioned at the center or approximate center in the winding axis direction of the coupling coil.

In the present preferred embodiment, in the coupling device 20, the second coupling conductor and the first coupling conductor are close to each other and in the same coil axis relationship, and thus, the first coupling conductor and the second coupling conductor are strongly coupled to each other. In addition, variations in the degree of coupling of the first coupling conductor and the second coupling conductor due to variations in the mounting position of the coupling coil are small.

Figure 5:
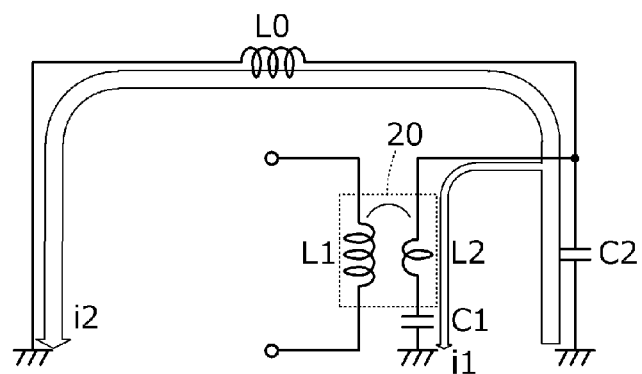
FIG. 5 is an equivalent circuit diagram of an antenna device 301.
Figure 6:
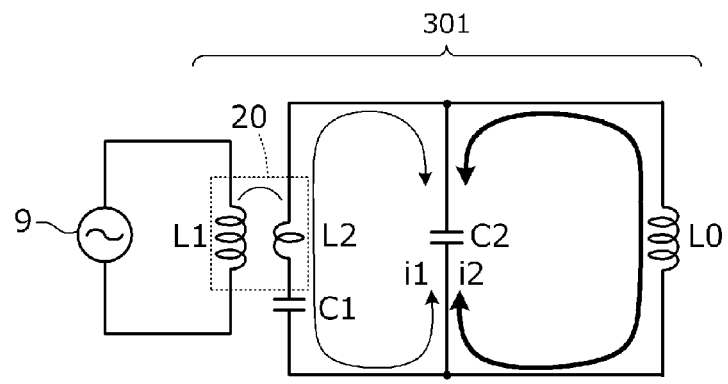
FIG. 6 is an equivalent circuit diagram of the antenna device 301 in a state where a power supply circuit is connected thereto.
Figure 7:
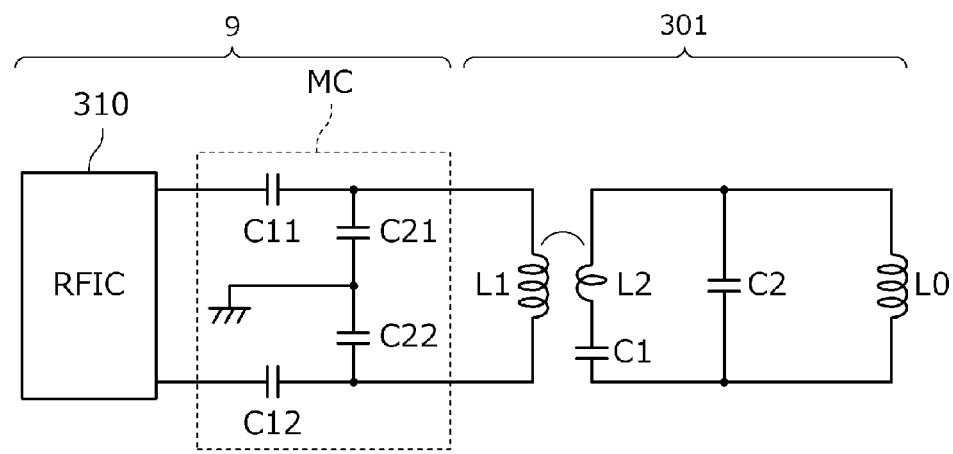
FIG. 7 is a circuit diagram also illustrating a configuration of the power supply circuit.
Figure 8:
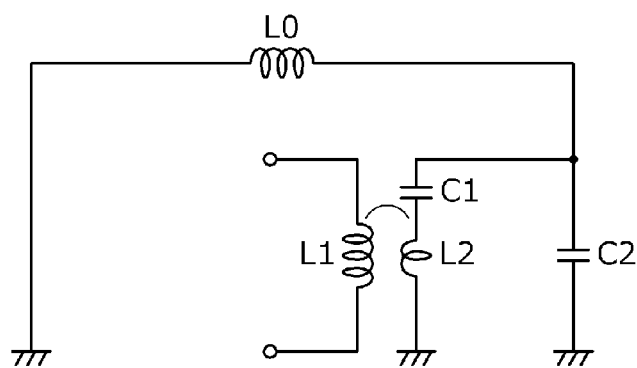
FIG. 8 is a diagram illustrating an equivalent circuit of an antenna device 302A according to a second preferred embodiment of the present invention, the equivalent circuit including a lumped-parameter element.
Figure 9:
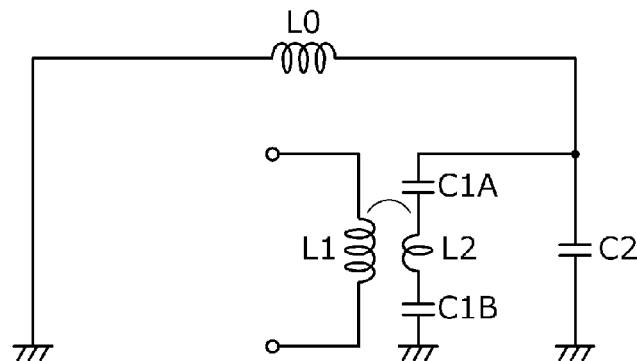
FIG. 9 is a diagram illustrating an equivalent circuit of an antenna device 302B according to the second preferred embodiment of the present invention, the equivalent circuit including a lumped-parameter element.

FIG. 5 is an equivalent circuit diagram of the antenna device 301. FIG. 6 is an equivalent circuit diagram of the antenna device 301 in a state in which a power supply circuit is connected thereto. FIG. 7 is a circuit diagram also illustrating a configuration of the power supply circuit. Each of FIG. 5, FIG. 6, and FIG. 7 is a diagram illustrating an equivalent circuit including a lumped-parameter element.

In each of FIG. 5, FIG. 6, and FIG. 7, an inductor L1 corresponds to the first coupling conductor, and an inductor L2 corresponds to the second coupling conductor. The inductor L0 corresponds to the second current path ("electrically conductive member") that has a closed-loop shape and that is defined by the first conductive portion 210, the second conductive portion 220, the conductive portion 230, and the second conductor patterns 12A and 12B.

Figure 23:
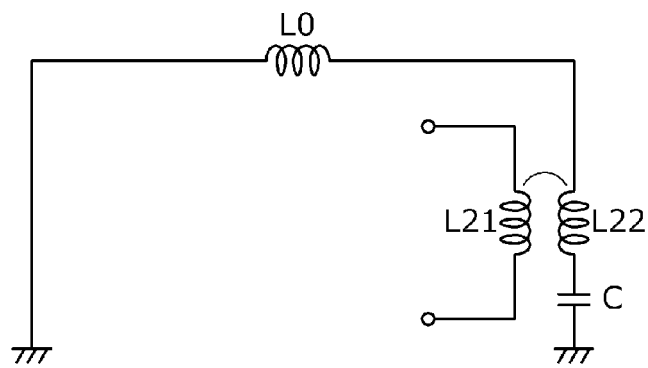
FIG. 23 illustrates an example of an equivalent circuit of an antenna device described in International Publication No. 2014/003163.

As illustrated in FIG. 6, a power supply circuit 9 is connected to the first coupling conductor L1. As illustrated in FIG. 5 and FIG. 6, the current i1 flows through the first current path, which is a series circuit including the second coupling conductor L2 and the first capacitor C1, and the current i2 flows through a current path that includes the inductor L0 and the second capacitor C2, the current path corresponding to the second current path. Here, when the capacitance of the first capacitor C1 and the capacitance of the second capacitor C2 are denoted by reference signs C1 and C2, respectively, a relationship of C1<C2 is satisfied. Thus, the current i2 that flows through the second current path is larger than the current i1 that flows through the first current path. The inductor L0 through which the current i2 flows is an inductor that contributes to coupling of the antenna device 301 and a coil antenna of a communication target, and thus, compared to an antenna device that is illustrated in FIG. 23 as an example of the related art, the antenna device 301 are strongly coupled to the coil antenna of the communication target.

In FIG. 7, the inductor L0, which corresponds to the electrically conductive member, and the capacitor C2 define an LC resonance circuit. The resonant frequency of this LC resonance circuit is included in a frequency band used in communication. More specifically, the resonant frequency of the LC resonance circuit is preferably within a range of a frequency that is about one-half of the frequency used in communication to a frequency that is about twice the frequency used in communication, for example.

An RFIC 310 is connected to the inductor L1, which corresponds to the first coupling conductor, via a matching circuit MC. The RFIC 310 is an integrated circuit that includes a wireless communication circuit for near field communication (NFC) that uses a frequency band of, for example, 13.56 MHz. The matching circuit MC is defined by capacitors C11 and C12 that are connected in series to each other and capacitors C21 and C22 that are shunt connected to the ground.

The inductance of the inductor L1, which is the first coupling conductor, is larger than the inductance of the inductor, which is the second coupling conductor. As a result, when a resonance circuit is defined by the first coupling conductor L1 and a circuit, such as the matching circuit MC that is connected to the first coupling conductor L1, the accuracy of a resonant frequency with respect to the accuracy of the inductance of the first coupling conductor L1 is improved. In other words, variations in the inductance of the first coupling conductor L1 are reduced, and thus, variations in the resonance frequency are reduced or prevented.

Although power is preferably supplied to the inductor L1, which corresponds to the first coupling conductor, with a balanced circuit, power may be supplied to the inductor L1 with an unbalanced circuit. In addition, the inductor L0 may be connected to a ground conductor. The first coupling conductor and the second coupling conductor are electrically connected to each other by magnetic coupling, and thus, the first coupling conductor and the second coupling conductor are able to be electrically connected to each other even if each of the first coupling conductor and the second coupling conductor is balanced or unbalanced.

Second Preferred Embodiment

In a second preferred embodiment of the present invention, several antenna devices in each of which the configuration of a circuit portion to which the second coupling conductor is connected is different from that described in the first preferred embodiment will be described.

FIG. 8 to FIG. 11 are diagrams illustrating equivalent circuits of antenna devices 302A to 302D according to the second preferred embodiment, each of the equivalent circuits including a lumped-parameter element. In the antenna device 302A illustrated in FIG. 8, the first capacitor C1 is connected to a non-ground side of the second coupling conductor L2. In the antenna device 302B illustrated in FIG. 9, first capacitors C1A and C1B are connected to a ground side and the non-ground side of the second coupling conductor L2. Advantageous effects similar to those of the antenna device 301 described in the first preferred embodiment are obtained with any of the structures.

Figure 10:
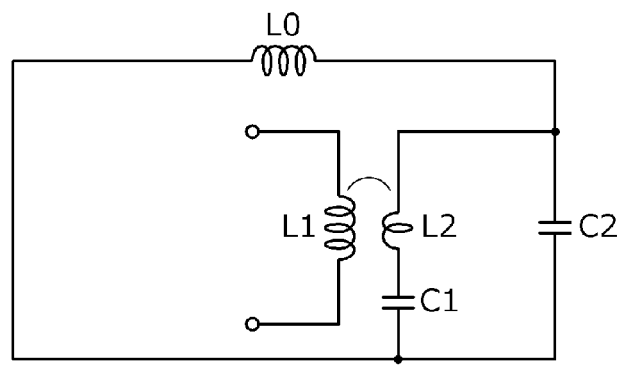
FIG. 10 is a diagram illustrating an equivalent circuit of an antenna device 302C according to the second preferred embodiment of the present invention, the equivalent circuit including a lumped-parameter element.
Figure 11:
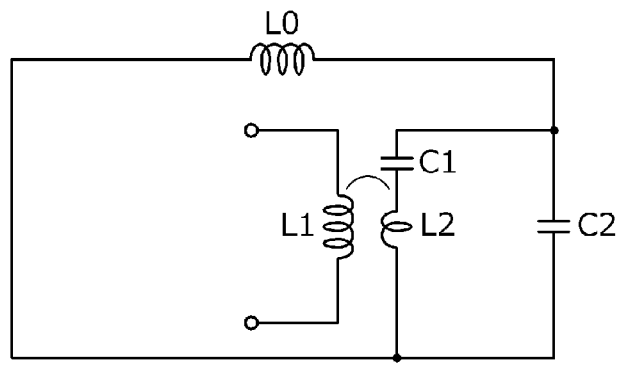
FIG. 11 is a diagram illustrating an equivalent circuit of an antenna device 302D according to the second preferred embodiment of the present invention, the equivalent circuit including a lumped-parameter element.

In each of the antenna device 302C illustrated in FIG. 10 and the antenna device 302D illustrated in FIG. 11, the inductor L0, which corresponds to the electrically conductive member, is not connected to the ground of the circuit. Even if a closed loop that includes the inductor L0, which corresponds to the electrically conductive member, and the second capacitor C2 is not connected to the ground of the circuit as described above, advantageous effects similar to those of the antenna device 301 described in the first preferred embodiment are obtained.

Third Preferred Embodiment

In a third preferred embodiment of the present invention, a case in which all of the electrically conductive members that define a closed loop together with the second capacitor are provided on a circuit board will be described.

Figure 12A:
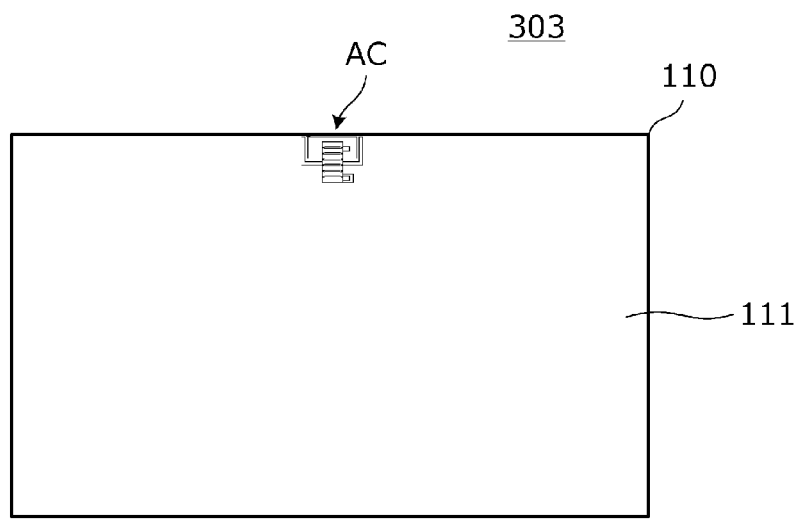
FIG. 12A is a plan view illustrating an antenna device 303 according to a third preferred embodiment of the present invention.
Figure 12B:
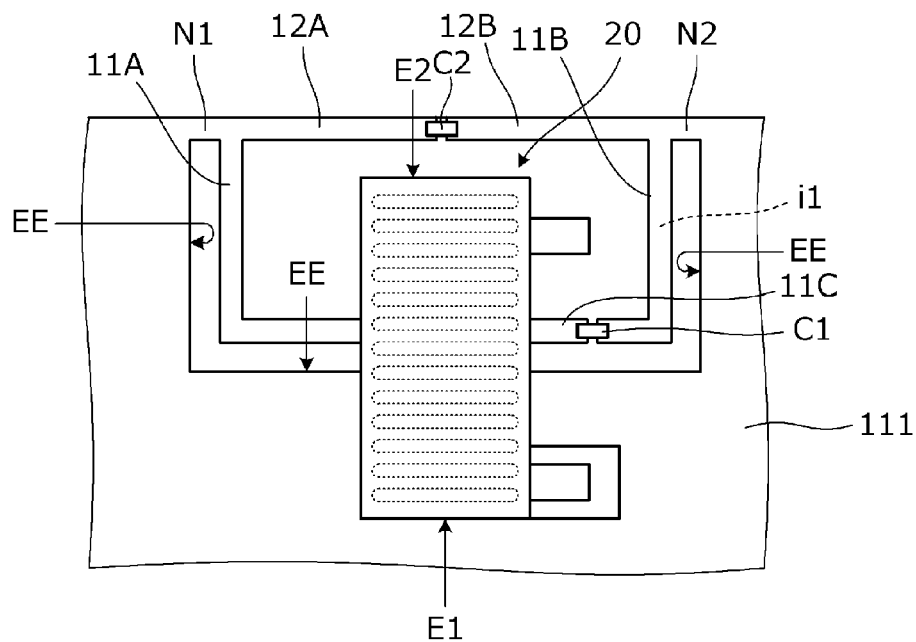
FIG. 12B is a plan view illustrating a coupling-coil-arranging portion AC of the antenna device 303.
Figure 13:
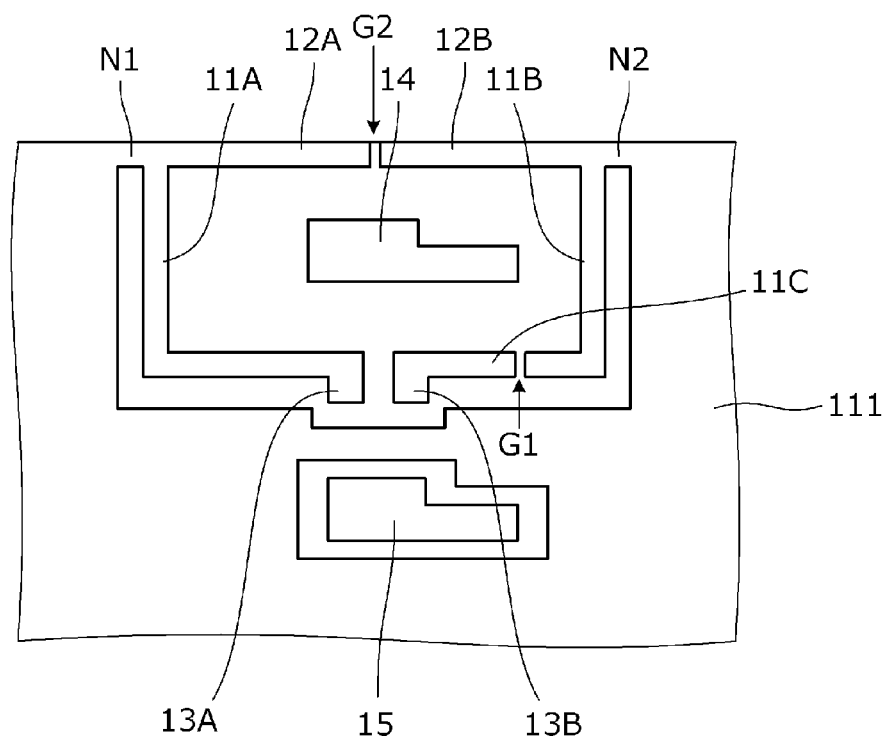
FIG. 13 is a plan view illustrating the coupling-coil-arranging portion before the coupling device 20 is mounted thereon.

FIG. 12A is a plan view illustrating an antenna device 303 according to the third preferred embodiment, and FIG. 12B is a plan view illustrating a coupling-coil-arranging portion AC of the antenna device 303. FIG. 13 is a plan view illustrating the coupling-coil-arranging portion before the coupling device 20 is mounted thereon.

The antenna device 303 includes a circuit board 110, the coupling device 20, the first capacitor C1, and the second capacitor C2. The structure of the coupling device 20 is the same or substantially the same as that described in the first preferred embodiment.

The first conductor patterns 11A, 11B, and 11C and the second conductor patterns 12A and 12B are provided on the circuit board 110. The second conductor patterns 12A and 12B are connected in parallel to the first conductor patterns 11A, 11B, and 11C at the first node N1 and the second node N2. In addition, the coupling device 20, which is a chip mounting component, the first capacitor C1, which is a chip capacitor, and the second capacitor C2, which is a chip capacitor, are mounted on the circuit board 110. Furthermore, a power supply circuit defined by a matching circuit, an RFIC, and other elements is provided on the circuit board 110.

The first conductor patterns 11A, 11B, and 11C and the second conductor patterns 12A and 12B are connected to a planar conductor 111 at the nodes N1 and N2, and the first conductor patterns 11A, 11B, and 11C are arranged so as to be close to one another along an outer edge EE of the planar conductor 111.

When the planar conductor 111 is viewed in plan view, the first coil-opening end E1 is located closer to the planar conductor 111 than the inside of a loop defined by the first conductor patterns 11A, 11B, and 11C and the second conductor patterns 12A and 12B, and the second coil-opening end E2 is located closer to the inside of the loop than the planar conductor 111.

The second coupling conductor of the coupling device 20 is connected in series to the first conductor patterns 11A, 11B, and 11C. The first capacitor C1 is also connected in series to the first conductor patterns 11A, 11B, and 11C. Accordingly, the first capacitor C1 is connected in series to the second coupling conductor.

The second capacitor C2 is connected in series to the second conductor patterns 12A and 12B. Accordingly, the second capacitor C2 is connected in parallel to a series circuit including the second coupling conductor and the first capacitor C1.

As illustrated in FIG. 13, a conductor gap G1 is provided between the first conductor pattern 11B and the first conductor pattern 11C, and the first capacitor C1 is connected to the first conductor pattern 11B and the first conductor pattern 11C so as to close the gap G1. A conductor gap G2 is provided between the second conductor pattern 12A and the second conductor pattern 12B, and the second capacitor C2 is connected to the second conductor pattern 12A and the second conductor pattern 12B so as to close the gap G2.

In this case, although the line length of the second conductor pattern 12A and the line length of the second conductor pattern 12B are preferably equal or substantially equal to each other, the gap G2 may be provided in the vicinity of the first node N1 or the second node N2, and the second capacitor C2 may be connected to the gap G2. In addition, in this case, although the gap G1 is preferably provided between the first conductor pattern 11B and the first conductor pattern 11C, the gap G1 may be provided in an intermediate portion of the first conductor pattern 11A, and the first capacitor C1 may be connected to the gap G1. Furthermore, the gap G1 may be provided in the vicinity of the second node N2 or in the vicinity of the first node N1, and the first capacitor C1 may be connected to the gap G1.

The second-coupling-conductor connection pads 13A and 13B are respectively provided at an end of the first conductor pattern 11A and an end of the first conductor pattern 11C. First-coupling-conductor connection pads 14 and 15 are provided on the circuit board 110. The coupling device 20 is connected to the first-coupling-conductor connection pads 14 and 15 and the second-coupling-conductor connection pads 13A and 13B. A power supply circuit that is connected to the first-coupling-conductor connection pads 14 and 15 is provided on the circuit board 110.

The antenna device 303 according to the present preferred embodiment includes a first current path including the first conductor patterns 11A, 11B, and 11C. The antenna device 303 further includes a second current path that has a closed-loop shape and that is defined by the second conductor patterns 12A and 12B and the planar conductor 111.

As in the present preferred embodiment, the electrically conductive members that define a closed loop together with the second capacitor C2 may be defined by only the conductors provided on the circuit board.

Fourth Preferred Embodiment

In a fourth preferred embodiment of the present invention, an example of an antenna device in which the configurations of a coupling device and the second coupling conductor are different from those described above.

Figure 14:
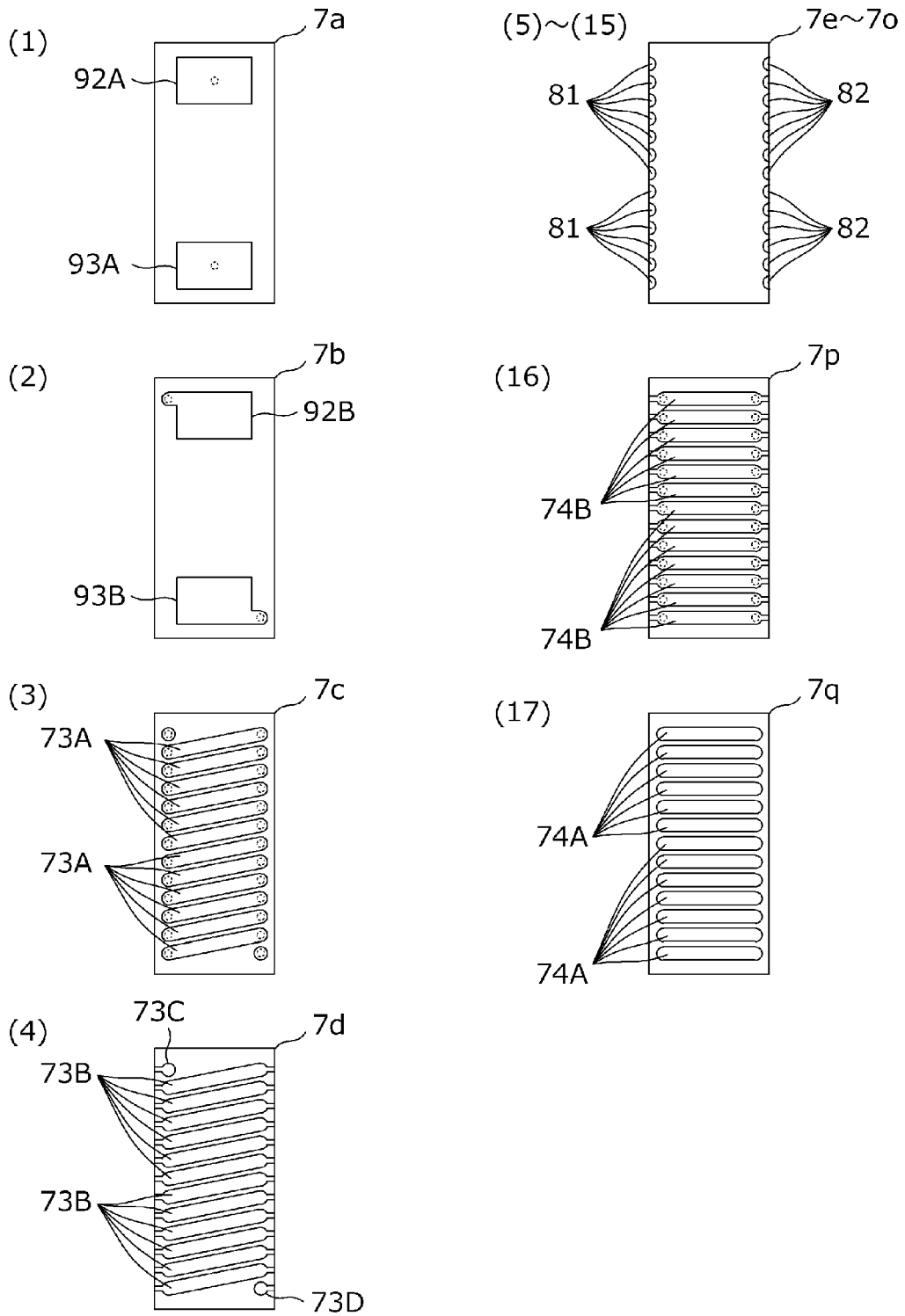
FIG. 14 is a diagram illustrating a configuration of a coupling device 21 included in an antenna device according to a fourth preferred embodiment of the present invention.

FIG. 14 is a diagram illustrating the configuration of a coupling device 21 included in an antenna device according to the fourth preferred embodiment. Similar to the example illustrated in FIG. 3, FIG. 14 is an exploded plan view illustrating electrode patterns and other elements of the base-material layers of the multilayer substrate.

Unlike the coupling device 20 illustrated in FIG. 3, conductor patterns that relate to the second coupling conductor are not provided. A first coupling conductor that is preferably wound in about thirteen turns and has a rectangular or substantially rectangular helical shape, for example, is defined by the linear conductors 73A, which are provided on the base-material layer 7c, the linear conductors 73B, which are provided on the base-material layer 7d, the linear conductors 74B, which are provided on the base-material layer 7p, the linear conductors 74A, which are provided on the base-material layer 7q, and the end surface conductors 81 and 82, which are provided on the base-material layer 7q. The rest of the configuration is the same or substantially the same as that illustrated in FIG. 3.

Figure 15:
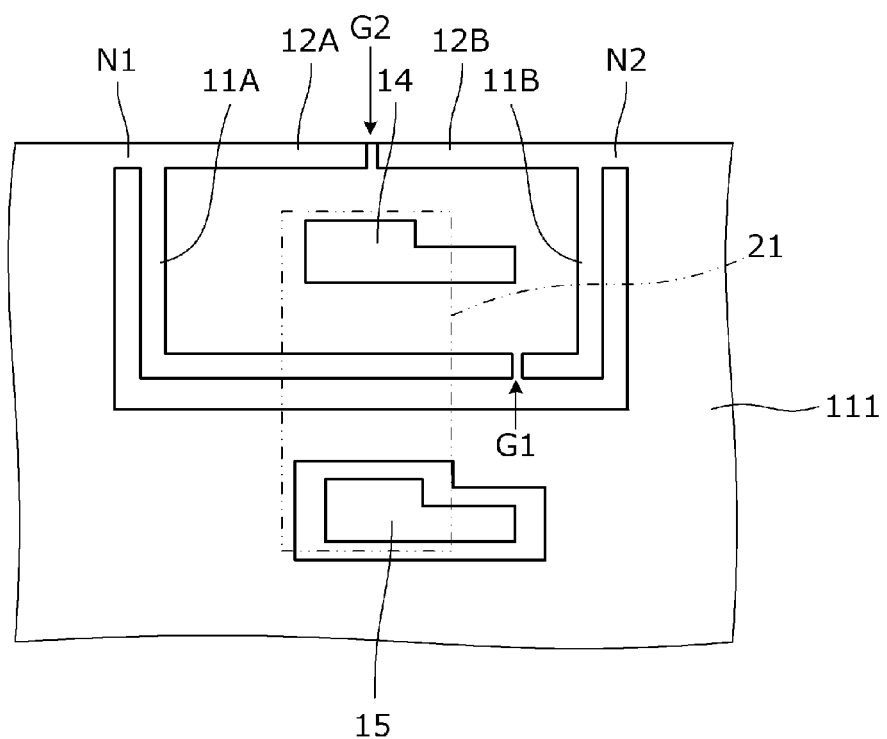
FIG. 15 is a plan view illustrating a coupling-coil-arranging portion before the coupling device 21 is mounted onto the coupling-coil-arranging portion.

FIG. 15 is a plan view illustrating a coupling-coil-arranging portion before the coupling device 21 is mounted thereon. Unlike the coupling-coil-arranging portion illustrated in FIG. 13, the second-coupling-conductor connection pads 13A and 13B are not provided, and the coupling device 21 is disposed on an upper portion of the first conductor pattern 11A. The portion of the first conductor pattern 11A onto which the coupling device 21 is disposed is the second coupling conductor. The rest of the configuration is the same or substantially the same as that illustrated in FIG. 13.

Note that the coupling device 21 does not need to be superposed with the first conductor patterns 11A, 11B and may be located at a position at which a coupling coil provided in the coupling device 21 is magnetically coupled to the first conductor patterns 11A, 11B.

According to the present preferred embodiment, the inductance of the second coupling conductor that does not directly contribute to coupling between the antenna device and a coil antenna of a communication target is reduced, so that the coupling coefficient between the antenna device and the coil antenna of the communication target is increased.

Fifth Preferred Embodiment

In a fifth preferred embodiment of the present invention, an example of an antenna device that partially uses a conductive portion of a housing of an electronic device as a planar conductor and an example of the electronic device that includes the antenna device are described.

Figure 16:
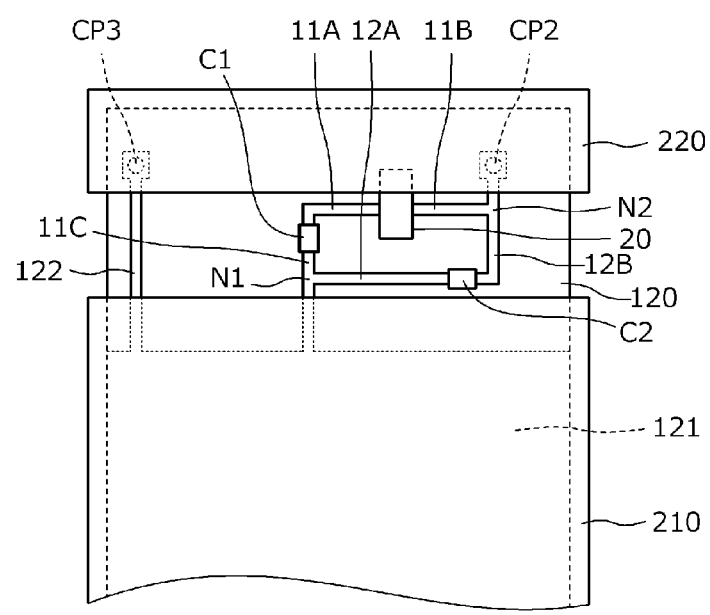
FIG. 16 is a plan view illustrating a principal portion of an electronic device 405 according to a fifth preferred embodiment of the present invention.

FIG. 16 is a plan view illustrating a principal portion of an electronic device 405 according to the fifth preferred embodiment. Note that FIG. 16 illustrates a state in which a housing resin portion has been removed from the electronic device 401.

Unlike the electronic device 401 according to the first preferred embodiment, the first node N1 is connected to a ground conductor pattern 121 provided on the circuit board 120. A conductor pattern 122 extends from the ground conductor pattern 121, and a connecting portion CP3 is provided at an end of the conductor pattern 122. The connecting portion CP3 is provided with a movable probe pin, and the movable probe pin is in contact with and electrically connected to the second conductive portion 220 of the housing. Thus, in the present preferred embodiment, a current path defined by the ground conductor pattern 121, the conductor pattern 122, the second conductive portion 220, and the second conductor patterns 12A and 12B is the "electrically conductive member". This electrically conductive member and the second capacitor C2 define a closed loop.

The rest of the configuration is the same or substantially the same as that of the electronic device 401 described in the first preferred embodiment.

Note that at least a portion of the electrically conductive member is a ground conductor pattern provided on the circuit board, and thus, the electric potentials of the electrically conductive member and the second capacitor C2 are stabilized. As a result, each of the electrically conductive member and the second capacitor C2 is prevented from becoming a noise emitter.

Sixth Preferred Embodiment

In a sixth preferred embodiment of the present invention, an example of an antenna device that uses a conductive portion of a housing of an electronic device as a planar conductor and an example of the electronic device that includes the antenna device are described.

Figure 17:
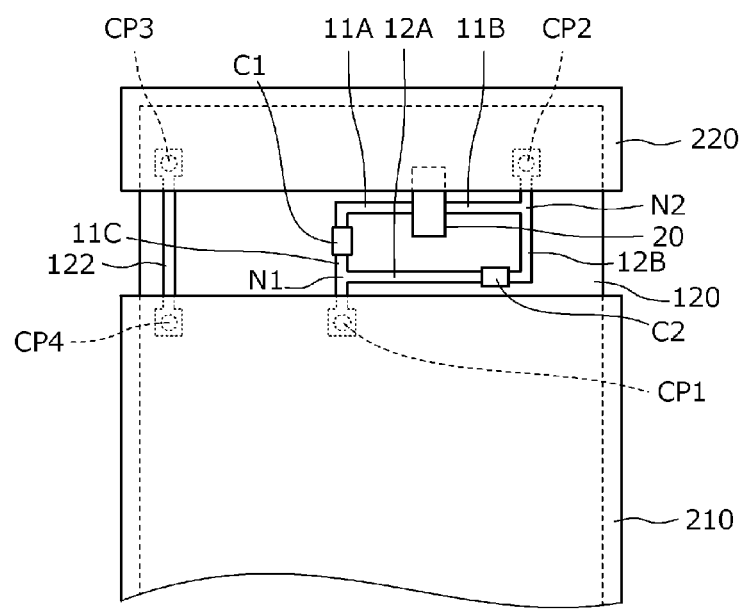
FIG. 17 is a plan view illustrating a principal portion of an electronic device 406 according to a sixth preferred embodiment of the present invention.

FIG. 17 is a plan view illustrating a principal portion of an electronic device 406 according to the sixth preferred embodiment. Note that FIG. 17 illustrates a state in which a housing resin portion has been removed from the electronic device 406.

Unlike the electronic device 401 according to the first preferred embodiment, the first conductive portion 210 and the second conductive portion 220 of the housing are connected to each other by the conductor pattern 122 provided on the circuit board 120. In other words, connecting portions CP3 and CP4 are provided at the ends of the conductor pattern 122, the connecting portions CP3 and CP4 are provided with a movable probe pin, and the movable probe pin is in contact with and electrically connected to the first conductive portion 210 and the second conductive portion 220 of the housing. Thus, in the present preferred embodiment, a current path including the first conductive portion 210, the conductor pattern 122, the second conductive portion 220, and the second conductor patterns 12A and 12B is provided.

The rest of the configuration is the same or substantially the same as that of the electronic device 401 described in the first preferred embodiment.

Seventh Preferred Embodiment

In a seventh preferred embodiment of the present invention, an antenna device that includes an electrically conductive member defining and functioning as both radiating elements of at least two frequency bands will be described. In the present preferred embodiment, preferably, a first frequency band is, for example, the HF band, and a second frequency band is, for example, the UHF band or the SHF band.

Here, for example, the numerical range of each of the frequency bands is expressed as follows:

HF band: about 3 MHz or more and about 30 MHz or less;
UHF band: about 300 MHz or more and about 3 GHz or less;
SHF band: about 3 GHz or more and about 30 GHz or less.

FIG. 18 to FIG. 21 are diagrams illustrating equivalent circuits of antenna devices 307A to 307D according to the seventh preferred embodiment. Here, the inductor L0, which is defined by an electrically conductive member, is illustrated in a linear configuration. In addition, FIG. 18 to FIG. 21 also illustrate a power supply circuit for the first frequency band and a power supply circuit for the second frequency band.

Figure 18:
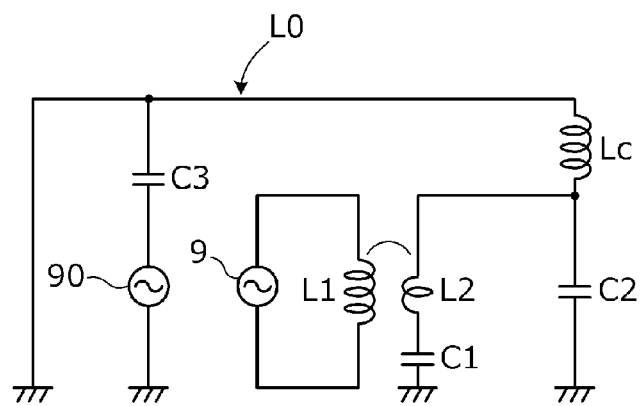
FIG. 18 is an equivalent circuit diagram of an antenna device 307A according to a seventh preferred embodiment of the present invention.

In the case of the antenna device 307A illustrated in FIG. 18, unlike the antenna device illustrated in FIG. 5, a choke coil Lc is interposed between a connection point between the second coupling conductor L2 and the second capacitor C2 and the inductor L0. A power supply circuit 90 for the second frequency band is connected to a predetermined portion of the inductor L0 via a capacitor C3. The choke coil Lc has a high impedance at which the choke coil Lc is substantially considered as an open end in the second frequency band, and the capacitor C3 has a low impedance in the second frequency band. Thus, the electrically conductive member (inductor L0) defines and functions as a radiating element of an inverted-F antenna in the second frequency band.

The power supply circuit 9 is for the first frequency band. The capacitor C3 has a high impedance at which the capacitor C3 is substantially considered to be open in the first frequency band, and the choke coil Lc has a low impedance in the first frequency band. Thus, a loop including the inductor L0, the choke coil Lc, and the second capacitor C2 defines and functions as a loop-shaped radiating element in the first frequency band.

Figure 19:
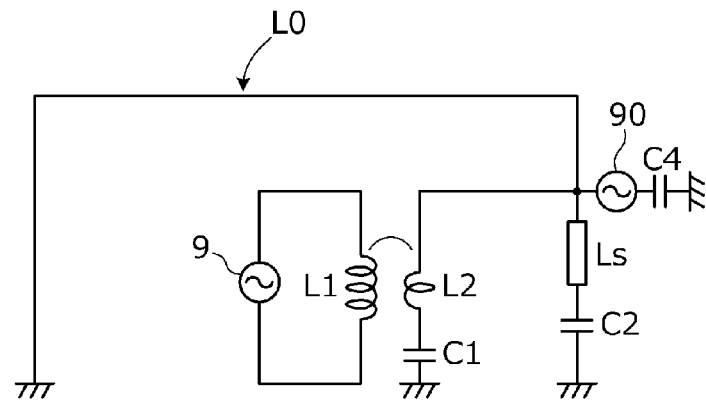
FIG. 19 is an equivalent circuit diagram of an antenna device 307B according to the seventh preferred embodiment of the present invention.

In the case of the antenna device 307B illustrated in FIG. 19, a transmission line Ls defining and functioning as a phase shifter is interposed between the inductor L0 and the second capacitor C2. The power supply circuit 90 for the second frequency band is connected between a connection point between the transmission line Ls and the inductor L0 or a point in the vicinity of the connection point and a circuit ground via a capacitor C4.

In the second frequency band, the second capacitor C2 becomes equivalently open due to the phase-shift action of the transmission line Ls. Thus, the electrically conductive member (inductor L0) defines and functions as a radiating element in the second frequency band.

The capacitance of the capacitor C4 is smaller than the capacitance of the second capacitor C2. Consequently, the current in the first frequency band flows through a main loop including the inductor L0, the choke coil Lc, and the second capacitor C2, and this main loop defines and functions as a radiating element in the first frequency band.

Figure 20:
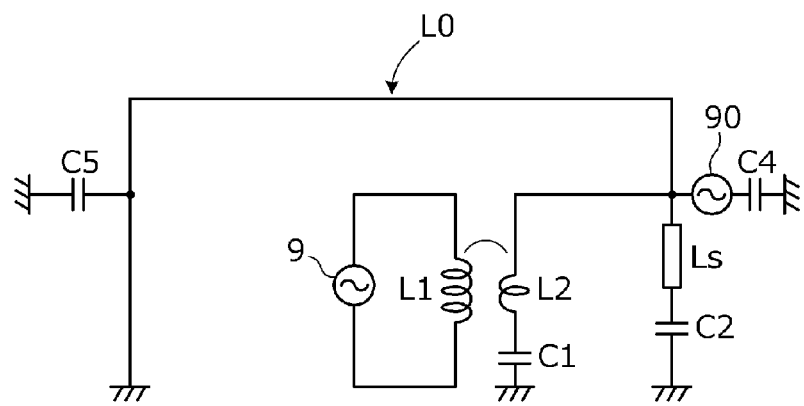
FIG. 20 is an equivalent circuit diagram of an antenna device 307C according to the seventh preferred embodiment of the present invention.

In the case of the antenna device 307C illustrated in FIG. 20, a predetermined portion of the electrically conductive member (inductor L0) is connected to the circuit ground via a capacitor C5. As a result, the electrical line length of the electrically conductive member (inductor L0) in the second frequency band is determined. The rest of the configuration of is the same or substantially the same as that of the antenna device 307B.

Figure 21:
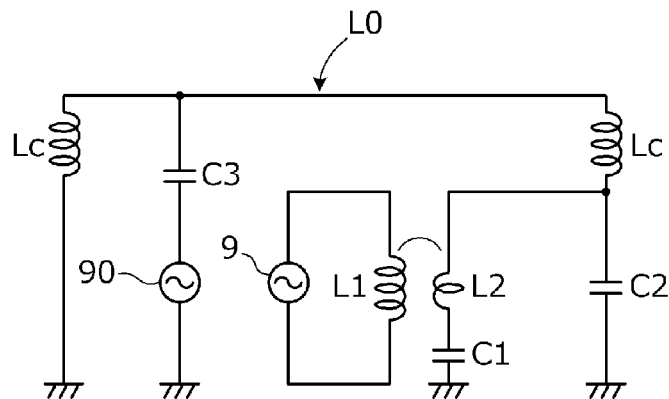
FIG. 21 is an equivalent circuit diagram of an antenna device 307D according to the seventh preferred embodiment of the present invention.

In the case of the antenna device 307D illustrated in FIG. 21, the choke coils Lc are interposed in predetermined two portions of the inductor L0. In addition, the power supply circuit 90 for the second frequency band is connected to a predetermined portion within a region between the two choke coils Lc via the capacitor C3. Thus, the electrically conductive member (inductor L0) defines and functions as a radiating element in the second frequency band. In the first frequency band, a loop including the inductor L0, the two choke coils Lc, and the second capacitor C2 defines and functions as a loop-shaped radiating element in the first frequency band.

According to the present preferred embodiment, since the electrically conductive member defines and functions as both radiating elements of at least two frequency bands, reductions in the sizes of the antenna device and the electronic device are achieved.

Eighth Preferred Embodiment

In an eighth preferred embodiment of the present invention, another example of a power supply circuit that is connected to the first coupling conductor is described.

Figure 22:
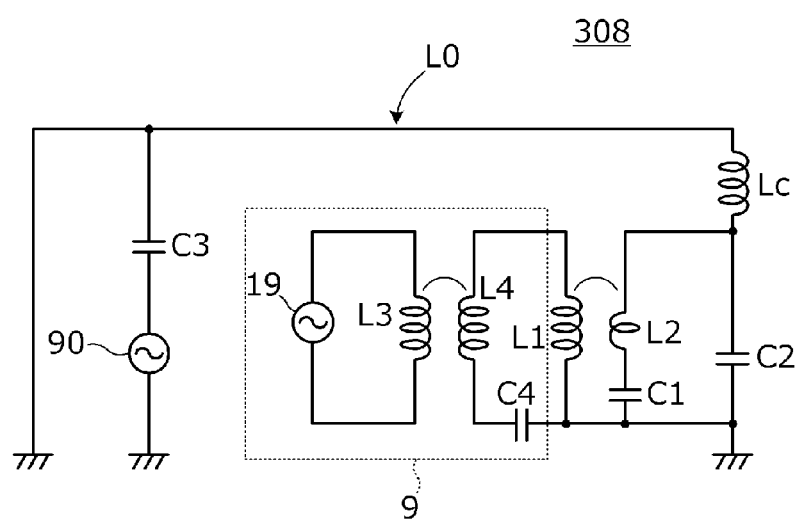
FIG. 22 is a diagram illustrating an equivalent circuit of an antenna device 308 according to an eighth preferred embodiment of the present invention and a power supply circuit.

FIG. 22 is a diagram illustrating an equivalent circuit of an antenna device 308 according to the eighth preferred embodiment and a power supply circuit. In FIG. 22, the antenna device 308 includes a balun including inductors L3 and L4. The inductor L3 and the inductor L4 are magnetically coupled to each other via an insulator having a high effective permeability. The inductor L4 is connected to the first coupling conductor L1 via the capacitor C4. A power supply circuit 19 including an RFIC is connected to the inductor L3. The configuration of the antenna device is the same or substantially the same as that of the antenna device 307A illustrated in FIG. 18.

An LC resonance circuit is defined by the first coupling conductor L1, the inductor L4, and the capacitor C4. The power supply circuit 19 performs balanced feeding on the inductor L3.

In the present preferred embodiment, a signal current from the power supply circuit 90 for the second frequency band does not flow through either of the inductors L3 and L4, and thus, both of the inductors L3 and L4 are provided on an insulator having a high effective permeability. Therefore, according to the present preferred embodiment, since the inductor L3 and the inductor L4 are magnetically coupled to each other via the insulator having a high effective permeability, the coupling coefficient between the inductors L3 and L4 is increased, and the transmission efficiency between the inductors L3 and L4 is increased.

In the present preferred embodiment, although the inductor L3 and the inductor L4 are magnetically coupled to each other, the inductor L3 and the inductor L4 define and function as a balun as a result of being insulated from each other. However, the inductor L3 and the inductor L4 may be DC-connected to each other or may be actively caused to have an electric field coupling relationship such that the inductor L3 and the inductor L4 do not function as a balun. In this case, the first coupling conductor L1 and the second coupling conductor L2 may be caused to function as a balun by insulating the first coupling conductor L1 and the second coupling conductor L2 from each other. Here, a circuit including an RFIC for the first frequency band is connected to a circuit including the inductor L0 via a cascade connection circuit defined by a mutual induction circuit including the inductor L3 and the inductor L4 and a mutual induction circuit including the first coupling conductor L1 and the second coupling conductor L2. Thus, in the case in which one of the circuit including the RFIC for the first frequency band and the circuit including the inductor L0 is a balanced circuit, and the other is an unbalanced circuit, it is only necessary that at least one of the mutual induction circuit including the inductor L3 and the inductor L4 and the mutual induction circuit including the first coupling conductor L1 and the second coupling conductor L2 function as a balun. In addition, by setting the transformer ratio of the mutual induction circuit including the inductor L3 and the inductor L4 and the transformer ratio of the mutual induction circuit including the first coupling conductor L1 and the second coupling conductor L2 to be any value other than 1:1, these mutual induction circuits may be used as a matching circuit that performs impedance conversion.

Note that, in each of the first, fifth, and sixth preferred embodiments, although conductive portions of the housing of the electronic device are preferably used as the first conductive portion and the second conductive portion, which correspond to the inductor L0, metal portions such as a chassis and a battery that are disposed in the electronic device may be used as the first conductive portion and the second conductive portion. In addition, for example, the inductor L0 may be an electrically conductive member that includes at least an inductance component, such as a coil pattern that is provided on a circuit board or a flexible wiring board and wound in about one or more turns.

In each of the above-described preferred embodiments, although a case has been described in which components, such as a capacitor and an inductor that are mounted on, for example, a circuit board are chip components, such as a chip capacitor and a chip inductor, the present invention is not limited to this case. For example, these components may be a lead-terminal component, an element provided on a flexible base member, and other suitable elements.

In addition, in each of the above-described preferred embodiments, although the antenna device and the electronic device in a communication system, such as NFC primarily using magnetic coupling have been described, the antenna device and the electronic device in each of the preferred embodiments may also be used in a wireless power transfer system (employing an electromagnetic induction method, a magnetic field resonance method, or other suitable method) using magnetic coupling. For example, the antenna device in each of the above-described preferred embodiments may be applied as a power-reception antenna device to a power-reception device of a wireless power transfer system that is used in the HF band, particularly about 6.78 MHz or a frequency in the vicinity of about 6.78 MHz and that uses a magnetic field resonance method. Also in this case, the antenna device defines and functions as a power-reception antenna device. In a wireless power transfer system, the "power supply circuit" described in the above-described preferred embodiments corresponds to a power-reception circuit or a power-transmission circuit. In the case in which the power supply circuit is a power-reception circuit, the power supply circuit is connected to a power-reception antenna device and supplies power to a load (e.g., a secondary battery). In the case in which the power supply circuit is a power-transmission circuit, the power supply circuit is connected to a power-transmission antenna device and supplies power to the power-transmission antenna device.

Lastly, the descriptions of the preferred embodiments above are examples in all respects, and the present invention is not to be considered limited to the preferred embodiments. Modifications and changes may be suitably made by those skilled in the art. The scope of the present invention is to be determined not by the above-described preferred embodiments, but by the claims. In addition, changes within the scope of the claims and their equivalents made to the preferred embodiments are included in the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a first coupling conductor that is connected to a power supply circuit;
a second coupling conductor that is at least magnetically coupled to the first coupling conductor;
a first capacitor that is connected in series to the second coupling conductor;
a second capacitor; and
a conductive member that includes an inductance component and that is connected in parallel to the second capacitor when viewed from a series circuit including the second coupling conductor and the first capacitor; wherein
a portion of or an entire closed loop including the second capacitor and the conductive member defines a magnetic-field radiating element; and
a capacitance of the first capacitor is smaller than a capacitance of the second capacitor.

2. The antenna device according to claim 1, wherein the first coupling conductor has a coil shape.

3. The antenna device according to claim 1, wherein the second coupling conductor has a coil shape.

4. The antenna device according to claim 1, wherein the first coupling conductor and the second coupling conductor are integrated with an insulating base, and the insulating base, the first coupling conductor, and the second coupling conductor define a single mounting component.

5. The antenna device according to claim 1, wherein
the first coupling conductor is integrated with an insulating base, and the insulating base and the first coupling conductor define a single mounting component; and
the second coupling conductor is defined by a conductor pattern provided on a circuit board, and the single mounting component is mounted adjacent or close to the conductor pattern.

6. The antenna device according to claim 1, wherein an inductance of the first coupling conductor is larger than an inductance of the second coupling conductor.

7. The antenna device according to claim 1, wherein at least a portion of the conductive member is a conductive portion of a housing in which the first coupling conductor and the second coupling conductor are located.

8. The antenna device according to claim 1, wherein at least a portion of the conductive member is a ground conductor pattern provided on a circuit board.

9. The antenna device according to claim 1, wherein the conductive member also defines and functions as a radiator in a frequency band higher than a frequency band of a signal fed by the power supply circuit.

10. An electronic device comprising:
an antenna device; wherein
the antenna device includes:
a first coupling conductor that is connected to a power supply circuit;
a second coupling conductor that is at least magnetically coupled to the first coupling conductor;
a first capacitor that is connected in series to the second coupling conductor;
a second capacitor; and
a conductive member that includes an inductance component and that is connected in parallel to the second capacitor when viewed from a series circuit including the second coupling conductor and the first capacitor;
a portion of or an entire closed loop including the second capacitor and the conductive member defines a magnetic-field radiating element; and
a capacitance of the first capacitor is smaller than a capacitance of the second capacitor.

11. The electronic device according to claim 10, wherein the first coupling conductor has a coil shape.

12. The electronic device according to claim 10, wherein the second coupling conductor has a coil shape.

13. The electronic device according to claim 10, wherein the first coupling conductor and the second coupling conductor are integrated with an insulating base, and the insulating base, the first coupling conductor, and the second coupling conductor define a single mounting component.

14. The electronic device according to claim 10, wherein
the first coupling conductor is integrated with an insulating base, and the insulating base and the first coupling conductor define a single mounting component; and
the second coupling conductor is defined by a conductor pattern provided on a circuit board, and the single mounting component is mounted adjacent or close to the conductor pattern.

15. The electronic device according to claim 10, wherein an inductance of the first coupling conductor is larger than an inductance of the second coupling conductor.

16. The electronic device according to claim 10, wherein at least a portion of the conductive member is a conductive portion of a housing in which the first coupling conductor and the second coupling conductor are disposed.

17. The electronic device according to claim 10, wherein at least a portion of the conductive member is a ground conductor pattern provided on a circuit board.

18. The electronic device according to claim 10, wherein the conductive member also defines and functions as a radiator in a frequency band higher than a frequency band of a signal fed by the power supply circuit.

* * * * *